United States Patent [19]
Brito

[11] Patent Number: 5,871,794
[45] Date of Patent: *Feb. 16, 1999

[54] STABILIZED GUACAMOLE AND METHOD FOR MAKING SAME

[76] Inventor: Jorge Issac Brito, La Arboleda, No. 114, Colonia Lomas de Bellavista, Atizapan de Zaragosa, Edo. de, Mexico, 53100

[ * ] Notice: This patent issued on a continued prosecution application filed under 37 CFR 1.53(d), and is subject to the twenty year patent term provisions of 35 U.S.C. 154(a)(2).

[21] Appl. No.: 694,636

[22] Filed: Aug. 7, 1996

[51] Int. Cl.⁶ .............................. A23B 7/005; A23B 7/10
[52] U.S. Cl. ........................... 426/270; 426/541; 426/615
[58] Field of Search ..................................... 426/270, 615, 426/541

[56] References Cited

U.S. PATENT DOCUMENTS

| | | |
|---|---|---|
| 3,398,001 | 8/1968 | Benson ..................................... 426/541 |
| 3,958,036 | 5/1976 | Latimer . |
| 4,572,836 | 2/1986 | Bakal . |
| 5,198,254 | 3/1993 | Nisperos-Carriedo et al. . |
| 5,202,141 | 4/1993 | McEvily et al. . |
| 5,384,147 | 1/1995 | Hilpert . |
| 5,389,389 | 2/1995 | Beck . |

OTHER PUBLICATIONS

Gordon, T. 1987, Avocado Recipes, etc. Morgan Publishing, Inc., Austin, Texas, p. 13.
Stone, I. 1978, 30 Classic Mexican Menus, Gramercy Publishing Co., N.Y. p. 14.

*Primary Examiner*—Helen Pratt
*Attorney, Agent, or Firm*—Vaden, Eickenroht & Thompson, L.L.P.

[57] ABSTRACT

A composition for a guacamole preparation that inhibits spoilage and/or oxidation of the avocado fruit present in the preparation and the discoloration and souring that commonly accompanies oxidation. The inhibitory effect is achieved through the use of a natural antioxidant or preservative that is found in tomatillo. The composition only requires avocado flesh and the pulp of tomatillo as no other chemical preservatives are required to achieve stability of the preparation. The composition may optionally include flavoring additives such as spices, peppers and vegetables and as well as chemical agents for controlling the pH of the composition. A process for preparing the composition is disclosed that includes combining the avocado flesh and tomatillo pulp and heating the mixture prior to sealing it in sterilized containers.

22 Claims, No Drawings

STABILIZED GUACAMOLE AND METHOD FOR MAKING SAME

BACKGROUND OF THE INVENTION

1. Field of the Invention

This invention pertains to foods that are subject to spoilage and to oxidation reactions following processing and/or packaging resulting in discoloration and undesirable changes in flavor. In particular, the present invention relates to a stabilized guacamole and a process for preparing a stabilized guacamole.

2. Description of the Prior Art

Browning, or oxidative darkening, of food products can result from both enzymatic and non-enzymatic chemical reactions in food. Enzymatic browning is the result of the action of enzymes such as polyphenol oxidase that catalyze the oxidation of mono- and di-phenols to o-quinones which then polymerize spontaneously to form dark colored, high molecular weight polymers, thus leading to the characteristic browning or formation of dark spots. Browning associated with non-enzymatic chemical reactions are also commonly due to the polymerization of phenolic compounds that are present in some foods. Both enzymatic and non-enzymatic browning constitute serious problems for the foods industry and result in millions of pounds of wasted food products each year.

Several physical methods have been developed for inhibiting oxidation and the resultant browning. One of the most common and well known methods is by heat inactivation of the enzymes through pasteurization or similar processes. Another method is shown in U.S. Pat. No. 3,958,036 issued to Latimer. Latimer describes a stabilized avocado preparation that is a dispersion or emulsion of avocado, water and vegetable gums. The stated objective of the dispersion is to prevent the water from separating from the avocado thereby, presumably minimizing contact between the avocado and oxygen. However, the disclosed dispersion is stable only for between one and three months and chemical agents are preferably added to maintain color.

An additional physical method that has been developed for inhibiting oxidation is described in U.S. Pat. No. 5,384,147 to Hilpert. This patent describes the use of an extremely high vacuum process for removing substantially all of the oxygen contained in the cells of food prior to its packaging. It is also noted that in addition to removing the oxygen from the food product that the prior art also discloses the substitution of inert gases such as nitrogen and carbon dioxide into processed food to prevent further oxidation.

Similarly, U.S. Pat. No. 4,572,836 to Bakal, which is directed to the preparation of a stabilized edible herb product, notes that dehydration is commonly used to stabilize food products for storage. It is also emphasized that the dehydration process frequently results in the loss of flavor from the food and is in fact a poor means of preventing oxidation of the stored food.

In addition to the various physical processes that may be performed to inhibit oxidation, the addition of chemical agents is also well known. The use of sulfiting agents such as sulphur dioxide and sodium bisulfite to inactivate enzymes is very well known in the industry. In fact sulfite is believed to be the most effective chemical additive used to prevent enzymatic discoloration in most produce. The mechanism of sulfites is one in which o-quinones are reduced to the mono- and/or di-phenols, thereby inhibiting the oxidation reaction. However, the use of sulfites in fresh fruits and vegetables has been banned by the U.S. Food and Drug Administration due to their adverse health effects in certain individuals and it is anticipated that their use may be completely eliminated in the future.

In addition to sulfiting agents, other chemical preservation agents have been used to inhibit oxidation in various food products. Representative examples of such chemical preservation agents include discoloration inhibitors such as ascorbic acid, citric acid, sorbic acid and malic acid, in addition to other additives such as salt, EDTA, dextrose, calcium chloride, sodium acid pyrophosphate and sodium citrate. However, none of these discoloration inhibitors have been found to be as effective as sulfites.

Recognizing the problems associated with the use of sulfites, others have combined various agents with lower concentrations of sulfites to obtain the desired inhibiting effect. U.S. Pat. No. 5,202,141, to McEvily et al. describes a method and composition for inhibiting oxidative darkening containing at least one substituted resorcinol derivative and a second additive, preferably a sulfite. U.S. Pat. No. 5,389,389 to Beck discloses the use of cysteine in conjunction with a small concentration of sulfite.

As noted, there are problems associated with both the physical and chemical methods used for inhibiting the oxidation of foods. Although the physical methods described above are largely free of adverse health effects on humans, they frequently have detrimental effects on the flavor and texture of the foods and are generally poor inhibitors of oxidation reactions. In terms of the available chemical additives, good antioxidant results can be achieved with the use of sulfites but not without the accompanying health risks. Alternatively, non-sulfite chemical agents can be used with less effective results thus requiring higher concentrations of the agents and an increased risk of adversely affecting the flavoring, texture and/or coloring of the food.

The spoilage and oxidation problems associated with many foods are particularly acute in avocados, creating an unresolved need for stabilizing avocados and their preparations from premature spoilage and oxidation. Therefore it is a feature of the present invention to provide a composition of a stabilized guacamole that it is inhibited from undergoing oxidation and the accompanying discoloration and loss of flavor, the composition comprising a mixture of avocado flesh, a naturally occurring preservative found in the pulp of tomatillo and optionally containing various flavoring agents and chemical agents for controlling the pH of the composition.

It is another feature of the present invention to provide a process for preparing a stabilized guacamole composition by mixing avocado flesh with a naturally occurring preservative found in the pulp of tomatillo and heating the mixture. The process optionally includes adding various flavoring agents and controlling the pH of the composition by adding various chemical agents.

It is still another feature of the present invention to provide a stabilized guacamole that is made from the disclosed process and that is free of sulfites.

It is yet another feature of the present invention to provide a process for preparing a stabilized guacamole composition that does not require extensive physical processing steps such as complex vacuum processing, dehydration or emulsification.

DESCRIPTION OF THE PREFERRED EMBODIMENTS

A stabilized guacamole composition of the present invention comprises avocado flesh and tomatillo pulp. Tomatillo is known by its Spanish name as "tomate de cáscara" and by its Latin name as *Physalis ixocarpa*. The tomatillo pulp contains a natural preservative which acts as an oxidation inhibitor thus preventing the undesirable discoloration and loss of flavor from the guacamole preparation that commonly accompanies oxidation. The avocado flesh may account for up to 85% or more by weight of the total composition while the tomatillo accounts for up to 15% or more. Most preferably, the avocado is about 79% of the composition and the tomatillo is about 10%. All percentages disclosed herein are percentages by weight of the total composition unless specifically stated otherwise.

Optionally, the composition may include various flavoring agents including but not limited to onion, chile serrano, jalapeno peppers, salt, and cilantro. The types of flavoring agents and their amounts will be chosen according to taste. However, the total amount of flavoring agents chosen may be up to 15% of the total composition while most preferably, they will account for about 10.65% of the total composition.

In addition, minor amounts of chemical agents such as citric acid, sodium benzoate and/or ascorbic acid may be added to control the pH of the composition. It is anticipated that only very small amounts of these chemical agents will be added if any at all. Although several of these agents can be used as additives to inhibit oxidation when used in sufficiently high concentrations, their use in the composition of the present invention is only for the purpose of controlling the pH. The use of one or more of these chemical agents is preferably limited to not more than about 0.50% of the total composition, and more preferably is limited to about 0.35%. At these minor concentrations the chemical agents are ineffective as oxidation inhibitors.

In the process of the present invention, the avocado flesh is prepared by separating it from the seed and skin and then dicing it into small pieces. This may be accomplished by cutting the avocado in half, removing the pit and separating the flesh from the skin. Preferably the avocado flesh is diced into small cubes to facilitate mixing. Any known means to facilitate the recovery of avocado flesh and its reduction to smaller sized pieces for mixing is appropriate. As noted above, in a preferred embodiment of the composition of this invention, the avocado flesh comprises about 79% by weight of the total composition.

The preparation of the tomatillo can be somewhat more involved. The tomatillo should be washed thoroughly and the outer husk removed. Although not required, it is recommended that the tomatillo be scalded to facilitate removal of the seeds. After scalding, the tomatillo is pressed to remove the seeds and separate the outer skin from the pulp. Pressing the tomatillo may be accomplished in a variety of ways but is preferably carried out in a pulper machine. Before mixing the pulp with the flesh of avocado it is likewise recommended that the pulp be reduced to smaller pieces to facilitate mixing. In the preferred embodiment of the present composition, the tomatillo comprises about 10% by weight of the total composition.

Optionally, various flavoring ingredients may be prepared for mixing with the avocado and tomatillo. For instance, it is preferred that onion, chile serrano and jalapeno peppers be cleaned and washed and reduced in size for including in the formulation. It is likewise preferable to include salt and finely minced cilantro in the composition. The choice of which flavoring agents are used and their respective amounts is determined largely by individual taste. Further, the types of flavoring agents that may be used are not limited to those discussed here. Other spices, herbs and seasonings may be used depending on individual taste. In the preferred embodiment of the composition of this invention onion comprises about 6% by weight of the total composition, chile serrano about 3.4%, cilantro about 0.45% and salt about 0.8%.

The prepared avocado, tomatillo and any optional flavoring agents are thoroughly mixed in a large capacity container suitable for heating the composition. After mixing, the composition is heated for approximately 10 minutes at about 85° C. After this heating, the guacamole product is stabilized in that it is inhibited from undergoing oxidation. The heating steps that are described below in connection with the packaging of this product may contribute to the inhibitory effect, but are strictly intended for the purpose of insuring that the packaging is sterilized and does not contaminate the guacamole product.

As noted above, certain chemical agents may be added in order to facilitate control over the pH of the composition. In particular, citric acid, sodium benzoate and ascorbic acid may be added for this purpose. Cumulatively, the amounts of these agents should not exceed 0.5% by weight of the total composition, and more preferably, citric acid will comprise about 0.15% of the total composition, sodium benzoate will comprise about 0.1% and ascorbic acid about 0.1%. It is recommended that these chemical agents, and the minced cilantro noted above as an optional flavoring ingredient, are not added until after the other ingredients have been thoroughly mixed and heated as described above.

The guacamole is then introduced into small storage containers that are able to withstand heating. These may include jars, cans or any other containers that may be sterilized and are appropriate containers in which to sell the product. The guacamole within the unsealed containers is then heated to approximately 85°–90° C. This heating step is performed just prior to the sealing of the containers and preferably occurs adjacent to a closing or sealing machine to insure that the containers are sealed while still hot. The 85° C. "sealing" temperature may be achieved by any means known in the art, including running the containers through an exhauster. It should also be noted that the sealing temperature need only be maintained for about 3 minutes.

It is preferable that the sealed containers be heated an additional period to complete sterilization. In the practice of the process of the invention, when the guacamole was stored in glass jars, the final heating was carried out at 92° C. for approximately 40 minutes. When the guacamole was stored in cans, the final heating stage was carried out at 105° C. for about 10 minutes. It is also preferable to carry out this sterilization heating at about 92° C. for about 35 minutes. Once the containers are cooled, they are ready to be cleaned, labelled and packaged for sale.

Various automated means may be used in the process of this invention, particularly when the process is carried out on a commercial scale. For instance, a pulper machine may used to press the tomatillo to remove the seeds and outer skin. More specifically, in the practice of the process of the present invention, an Urshell, Model GA dicing machine may be employed to dice avocado flesh, tomatillo pulp, onions, jalapeno peppers and cilantro down to an approximate size of ⅜". Conveyor belts and small baskets are used for transporting ingredients and containers between machines. Lastly, as was noted, an exhauster and/or a retorte may be used during the sterilization of the filled product containers.

The guacamole product of the above describe process is shelf stable without refrigeration. When prepared according to this process, the product is stable for a period of between eighteen and twenty four months without undergoing substantial oxidation or spoilage.

Further additional embodiments can be chosen by using different combinations of flavoring agents according to varying tastes. However, the general principles for obtaining a guacamole composition that is stabilized against oxidation without the use of chemical antioxidant additives are applicable as discussed above even though the combination of ingredients may be different or more complex. Thus, while several embodiments have been discussed and other embodiments have been generally described, it is understood that the invention is not limited thereto, since many modifications may be made and will become apparent to those skilled in the art.

What is claimed is:

1. A composition for a stabilized guacamole that can be stored at room temperature without spoilage, comprising avocado flesh; and tomatillo pulp, wherein the avocado and tomatillo have been heated for about 10 minutes at about 85° C.

2. The composition of claim 1 further comprising at least one flavoring agent chosen from the group consisting of onion, chile serrano, jalapeno pepper, salt and cilantro.

3. The composition of claim 2, wherein the flavoring agents are in an amount up to about 15%.

4. The composition of claim 2 wherein the flavoring agents are in an aggregate amount of about 10.65%.

5. The composition of claim 1 further comprising at least one pH stabilizing agent chosen from the group consisting of citric acid in an amount up to about 0.15%, sodium benzoate in an amount up to about 0.10% and ascorbic acid in an amount up to about 0.10%.

6. The composition of claim 1 wherein the avocado flesh is in an amount up to about 85%.

7. The composition of claim 1 wherein the tomatillo pulp is in an amount up to about 15%.

8. The composition of claim 1 wherein the avocado flesh is about 79%.

9. The composition of claim 1 wherein the tomatillo pulp is about 10%.

10. A process for preparing a stabilized guacamole that can be stored at room temperature without spoilage comprising the steps of:

removing the skin and pit of an avocado to obtain avocado flesh;

removing the husk, seeds and outer skin from a tomatillo to obtain tomatillo pulp;

mixing the avocado flesh and tomatillo pulp; and heating the mixture to about 85° C. for about 10 minutes.

11. The process of claim 10 further comprising the steps of washing, scalding and pressing the tomatillo pulp prior to removing the seeds and outer skin.

12. The process of claim 10 further comprising the additional step of adding at least one flavoring agent of the group consisting of onion, chile serrano, jalapeno pepper, salt and cilantro.

13. The process of claim 10 further comprising adding one or more pH stabilizing agents chosen from the group consisting of citric acid, sodium benzoate and ascorbic acid in an amount up to about 0.35% after the mixture has been heated.

14. The process of claim 10 further comprising the steps of placing the avocado and tomatillo mixture in sterilized containers, heating the mixture in the unsealed containers at about 85° C. for about 3 minutes and sealing the containers.

15. The process of claim 14 further comprising the step of heating the sealed containers after sealing at about 92° C. for about 40 minutes where the containers are made of glass.

16. The process of claim 14 further comprising the step of heating the sealed containers after sealing at about 105° C. for about 10 minutes where the containers are made of metal.

17. A stabilized guacamole preparation that can be stored at room temperature without spoilage made by the process of:

removing the skin and pit of an avocado to obtain avocado flesh;

removing the husk, seeds and outer skin of a tomatillo to obtain tomatillo pulp;

mixing the avocado flesh and tomatillo pulp;

heating the mixture to about 85° C. for about 10 minutes; and placing the mixture in sterilized containers.

18. A stabilized guacamole preparation made from the process claim 17 wherein the removal of the seeds and outer skin of the tomatillo pulp is achieved by pressing the tomatillo pulp.

19. A stabilized guacamole preparation made from the process claim 17 further comprising the step of adding to the mixture of avocado flesh and tomatillo pulp at least one flavoring agent of the group consisting of onion, chile serrano, jalapeno pepper, salt, and cilantro.

20. A stabilized guacamole preparation made from the process claim 17 further comprising adding to the mixture one or more pH stabilizing agents chosen from the group consisting of citric acid, sodium benzoate and ascorbic acid.

21. A stabilized guacamole preparation made from the process claim 17 further comprising heating the mixture in the unsealed containers up to about 3 minutes at about 90° C.

22. A stabilized guacamole preparation made from the process claim 17 further comprising sealing the containers and heating the sealed containers to insure sterilization.

* * * * *